(12) United States Patent
Kim

(10) Patent No.: US 10,229,271 B2
(45) Date of Patent: Mar. 12, 2019

(54) SYSTEM-ON-CHIPS AND ELECTRONIC DEVICES INCLUDING SAME

(71) Applicant: SAMSUNG ELECTRONICS CO., LTD., Suwon-si, Gyeonggi-Do (KR)

(72) Inventor: Youn-Hee Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 138 days.

(21) Appl. No.: 15/367,360

(22) Filed: Dec. 2, 2016

(65) Prior Publication Data

US 2017/0185781 A1 Jun. 29, 2017

(30) Foreign Application Priority Data

Dec. 29, 2015 (KR) .......................... 10-2015-0188888

(51) Int. Cl.
| | |
|---|---|
| *G06F 9/00* | (2006.01) |
| *G06F 21/57* | (2013.01) |
| *G06F 9/4401* | (2018.01) |
| *H04L 9/30* | (2006.01) |
| *H04L 9/14* | (2006.01) |
| *H04L 9/32* | (2006.01) |
| *G06F 8/65* | (2018.01) |

(52) U.S. Cl.
CPC .............. *G06F 21/575* (2013.01); *G06F 8/65* (2013.01); *G06F 9/4406* (2013.01); *H04L 9/14* (2013.01); *H04L 9/30* (2013.01); *H04L 9/3247* (2013.01)

(58) Field of Classification Search
CPC ........ G06F 21/575; G06F 8/65; G06F 9/4406; H04L 9/14; H04L 9/30

USPC .................................. 713/1, 2, 189; 712/205
See application file for complete search history.

(56) References Cited

U.S. PATENT DOCUMENTS

| | | | |
|---|---|---|---|
| 7,502,928 B2 | 3/2009 | Suzuoki et al. | |
| 8,209,527 B2* | 6/2012 | Im ......................... | G06F 9/4405 713/1 |
| 8,281,169 B2 | 10/2012 | Borras et al. | |
| 8,495,354 B2* | 7/2013 | Hobson ................. | G06F 21/572 365/232 |
| 9,858,429 B2* | 1/2018 | Lee ....................... | G06F 21/606 |

(Continued)

FOREIGN PATENT DOCUMENTS

| | | |
|---|---|---|
| KR | 100628051 B1 | 9/2006 |
| KR | 1020090090183 A | 8/2009 |

*Primary Examiner* — Aurel Prifti
(74) *Attorney, Agent, or Firm* — Volentine, Whitt & Francos, PLLC

(57) ABSTRACT

A system-on-chip (SoC) includes an application processor (AP) including a secure module and a non-secure module, a communication processor (CP), a volatile memory having a first area accessible by the CP, a second area accessible by only the AP, and a third area accessible by the CP and the AP, and non-volatile memory storing a boot loader and a firmware image. Upon power-up of the SoC, the AP copies the boot loader and firmware image from the non-volatile memory to the first area using the non-secure module, switches the first area from a normal mode to a secure mode using the secure module, and verifies integrity of the first firmware image to activate a reset signal. The CP then performs a CP boot operation using the boot loader and firmware image stored in the first area in response to the activated reset signal.

20 Claims, 13 Drawing Sheets

(56) References Cited

U.S. PATENT DOCUMENTS

| | | | |
|---|---|---|---|
| 2004/0255111 A1* | 12/2004 | Lim | G06F 9/4405 |
| | | | 713/2 |
| 2006/0090084 A1* | 4/2006 | Buer | G06F 21/53 |
| | | | 713/189 |
| 2008/0040599 A1* | 2/2008 | Yoshida | G06F 9/4405 |
| | | | 713/2 |
| 2008/0215872 A1* | 9/2008 | Choi | G06F 21/575 |
| | | | 713/2 |
| 2010/0070691 A1 | 3/2010 | Kwon | |
| 2010/0095089 A1 | 4/2010 | Kwon | |
| 2010/0134243 A1* | 6/2010 | Colley, III | G07C 9/00896 |
| | | | 340/5.7 |
| 2010/0293357 A1* | 11/2010 | Park | G06F 21/74 |
| | | | 712/205 |
| 2011/0091039 A1* | 4/2011 | Spitz | G06F 21/575 |
| | | | 380/260 |
| 2011/0258426 A1* | 10/2011 | Mujtaba | G06F 21/57 |
| | | | 713/2 |
| 2013/0124840 A1* | 5/2013 | Diluoffo | G06F 21/575 |
| | | | 713/2 |
| 2013/0282951 A1 | 10/2013 | Kuo et al. | |
| 2014/0053001 A1 | 2/2014 | Rodgers et al. | |
| 2014/0331034 A1* | 11/2014 | Ponce | G06F 9/4401 |
| | | | 713/1 |
| 2015/0039876 A1* | 2/2015 | Baratam | G06F 9/4401 |
| | | | 713/2 |
| 2015/0154031 A1* | 6/2015 | Lewis | G06F 9/4406 |
| | | | 713/2 |
| 2016/0300064 A1* | 10/2016 | Stewart | G06F 21/575 |
| 2016/0378697 A1* | 12/2016 | Jayakumar | G06F 13/24 |
| | | | 710/261 |
| 2018/0035293 A1* | 2/2018 | Elnekaveh | H04L 9/14 |

\* cited by examiner

SYSTEM-ON-CHIPS AND ELECTRONIC DEVICES INCLUDING SAME

CROSS-REFERENCE TO RELATED APPLICATION(S)

This application claims priority under 35 USC § 119 to Korean Patent Application No. 10-2015-0188888, filed on Dec. 29, 2015 in the Korean Intellectual Property Office (KIPO), the subject matter of which is hereby incorporated by reference.

BACKGROUND

1. Technical Field

Embodiments of the inventive concept relate generally to System-on-Chips (SoCs), and more particularly to SoCs including both an application processor and a communication processor.

2. Description of the Related Art

The enhanced functionality and capabilities of contemporary electronic devices, such as smart phones, generally require the inclusion of multiple different processors. In order to limit the physical size of such electronic devices, the multiple processors (e.g., an application processor and a communication processor) are often integrated onto a single semiconductor substrate, or SoC. However, each one of the multiple processors usually requires a dedicated non-volatile memory storing a corresponding boot loader and/or firmware data, and a volatile memory to which the boot loader and firmware data may be loaded from the non-volatile memory during a power-up operation.

Since each one of the multiple processors provided on a SoC conventionally requires the provision of a non-volatile memory and a volatile memory, the number of processors that may be reasonably included within a SoC may become unduly limited, unless the physical size of the SoC is increased.

SUMMARY

Certain embodiments of the inventive concept provide a System-on-Chip (SoC) providing a relatively fast boot speed (s), while maintaining an acceptable level of data security level and a relatively small physical size for the SoC. Certain embodiments of the inventive concept various electronic devices including this type of SoC. Certain embodiments of the inventive concept provide SoC operating methods that provide relatively fast boot speed(s), while maintaining an acceptable level of data security level and a relatively small physical size for the SoC.

According to embodiments, a system-on-chip includes; a non-volatile memory that stores a first boot loader and a first firmware image, a volatile memory including a first area, a second area, and a third area, an application processor (AP) configured upon powered-up to copy the first boot loader and first firmware image from the non-volatile memory to the first area, switch the first area from a normal mode to a secure mode, verify integrity of the first firmware image stored in the first area, and activate a reset signal upon successfully verifying the integrity of the first firmware image, and a communication processor (CP) configured to perform a CP boot operation using at least one of the first boot loader and first firmware image stored in the first area in response to the activated reset signal.

According to embodiments, an electronic device includes; an antenna, a storage device that stores data, and a System-on-Chip (SoC) configured to communicate the data with an external device using the antenna. The SoC includes; a non-volatile memory configured to store a first boot loader and a first firmware image, a volatile memory including a first area, a second area, and a third area, an application processor (AP) configured, upon power-up, to copy the first boot loader and first firmware image from the non-volatile memory to the first area, switch the first area from a normal mode to a secure mode, verify integrity of the first firmware image stored in the first area, and to activate a reset signal when the verification succeeds, and a communication processor (CP) configured to perform a CP boot operation using the first boot loader and first firmware image stored in the first area in response to the activated reset signal.

According to embodiments, a system-on-chip (SoC) includes; an application processor (AP) including a secure module and a non-secure module, a communication processor (CP), a volatile memory having a first area accessible by the CP, a second area accessible by only the AP, and a third area accessible by the CP and the AP, and a non-volatile memory storing a first boot loader, a first firmware image, a second boot loader, a second firmware image and operating parameters. Upon power-up of the SoC, the AP is configured to: copy the second boot loader and second firmware image from the non-volatile memory to the second area, and perform an AP boot operation using the second boot loader and second firmware image, copy the first boot loader, first firmware image and the operating parameters from the non-volatile memory to the first area using the non-secure module, switch the first area from a normal mode to a secure mode using the secure module, and verify integrity of the first firmware image stored in the first area, and upon successfully verifying the integrity of the first firmware activate a reset signal provided to the CP. The CP is configured to perform a CP boot operation using the first boot loader, first firmware image and operating parameters stored in the first area in response to the activated reset signal.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, the inventive concept will now be described more fully with reference to the accompanying drawings, in which exemplary embodiments of the inventive concept are shown. Like reference numbers and labels denote like or similar elements. The inventive concepts may, however, be embodied in different forms and should not be construed as being limited to only the illustrated embodiments set forth herein.

Figure 1:
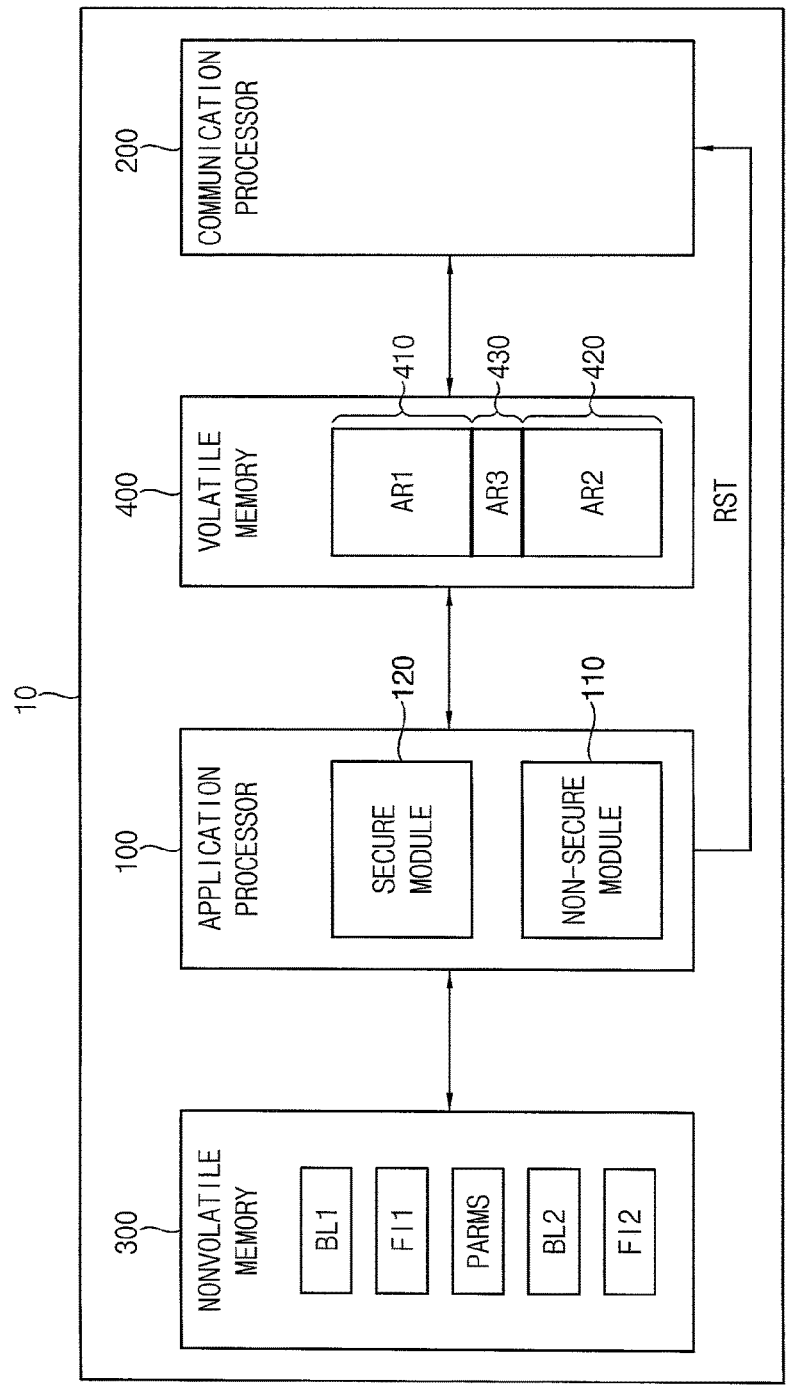
FIG. 1 is a block diagram illustrating a System-on-Chip (SoC) according to certain embodiments of the inventive concept.

FIG. 1 is a block diagram illustrating a System-on-Chip (SoC) 10 according to certain embodiments of the inventive concept. Referring to FIG. 1, the SoC 10 includes an application processor (AP) 100, a communication processor (CP) 200, a non-volatile memory 300, and a volatile memory 400, wherein the AP 100 may be used to control the overall operation of the SoC 10 and the CP 200 may be used to communicate with one or more external device(s). In this context, a SoC including both an AP and a CP may be referred to as ModAP.

In some embodiments, the CP 200 may take the form of a module that facilitates wireless communication, such as a long term evolution (LTE) communication, a wideband code division multiple access (WCDMA) communication, etc.

In the illustrated example of FIG. 1, the AP 100 is directly connected to the non-volatile memory 300 and the volatile memory 400. Therefore, the AP 100 may access (e.g., perform read, write and/or erase operations in relation to) the non-volatile memory 300, as well as the volatile memory 400. In contrast, the CP 200 is directly connected to the volatile memory 400 and may access the volatile memory 400, but is not directly connected to the non-volatile memory 300 and may not access the non-volatile memory 300 without intervention of the AP 100. Thus, as between the AP 100 and CP 200 illustrated in FIG. 1, the volatile memory 400 may be understood as a "shared" memory resource, while the non-volatile memory 300 is an "exclusive" memory resource with respect to only the AP 100.

As illustrated in FIG. 1, the non-volatile memory 300 may be used to store a first boot loader BL1 used to boot (i.e., initiate operation of) the CP 200, a first firmware image FI1 including an operating code for the CP 200, certain operating parameters PARMS (e.g., security keys, equipment identification data, clock frequencies, communication frequencies, etc.) associated with or required for the operation of the AP 100 and/or CP 200, a second boot loader BL2 used to boot the AP 100, and a second firmware image FI2 including an operating system code of the AP 100.

In some embodiments, one or more of the first boot loader BL1, first firmware image FI1, operating parameters PARMS, second boot loader BL2, and second firmware image FI2 may be stored in the non-volatile memory 300 during end stages of the fabrication of the SoC 10 by its manufacturer. That is, the provision of the first boot loader BL1, first firmware image FI1, operating parameters PARMS, second boot loader BL2, and/or second firmware image FI2 to the non-volatile memory 300 may be performed prior to an initial use of an electronic device incorporating the SoC 10.

In some embodiments, the non-volatile memory 300 may include one or more of the following non-volatile memories; e.g., an electrically erasable programmable read-only memory (EEPROM), such as a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The volatile memory 400 may include a first area AR1 410, a second area AR2 420, and a third area AR3 430. Here, the first area 410 may be exclusively and securely used by only the CP 200—following an initial loading of software/data (e.g., first boot loader BL1, first firmware image FI1 and operating parameters PARMS) to the first area 410 by the AP 100 (e.g., loading software/data copied from the non-volatile memory 300 by the AP 100). The second area 420 may be exclusively used by only the AP 100, and the third area 430 may be shared by the AP 100 and CP 200. In certain embodiments, the third area 430 may be used for an interprocessor communication (IPC) between the AP 100 and the CP 200.

In some embodiments, the volatile memory 400 may include (e.g.,) a dynamic random access memory (DRAM) device, and/or a static random access memory (SRAM) device.

Upon power-up of the SoC 10, the AP 100 may perform an AP boot operation using the second boot loader BL2, second firmware image FI2 and operating parameters PARMS stored in the non-volatile memory 300. Once successfully booted, the AP 100 may copy the first boot loader BL1, first firmware image FI1, and/or the operating parameters PARMS stored in the non-volatile memory 300 to the first area 410 of the volatile memory 400. Once this data has been successfully copied to the first area 410 of the volatile memory 400, an access designator (e.g. a switch) may be changed from a normal mode one allowing access by the AP 100 to the first area 410 to a secure mode disallowing (or disabling) access by the AP 100 to the first area 410. Alternately, the secure mode may allow access to the first area 410 by the CP 200 and a secure module within the AP 100. Before switching the first area 410 of the volatile memory 400 to the secure mode, the AP 100 should verify the integrity of (e.g.,) the first firmware image FI1 stored in the first area 410. One possible approach to the verifying of the integrity of the first firmware image FI1 stored in the first area 410 will be described hereafter with reference to FIGS. 4 and 5.

Once verification has been successfully completed, the AP 100 may activate a reset signal RST provided to the CP 200. In response to the activation of the reset signal RST, the CP 200 may perform a CP boot operation using the first boot loader BL1 and the first firmware image FI1 stored in the first area 410 of the volatile memory 400. Once the CP 200 has successfully booted, the CP 200 may perform various "normal" operation(s) defined in part by the operating parameters PARMS stored in the first area 410.

However, if verification fails, the AP 100 determines that the first firmware image FI1 stored in the first area 410 is damaged due to a data error or some external attack (e.g., a hacker) and maintains the reset signal RST in a deactivated state. And so long as the reset signal RST remains deactivated, the CP 200 remains in an OFF state without performing the boot operation.

In certain embodiments of the inventive concept, the CP 200 may operate in a secure mode. Therefore, the CP 200 may perform read, write and/or erase operation(s) in relation to the first area 410, even when the first area 410 operates in the secure mode.

As illustrated in FIG. 1, the AP 100 may include a non-secure module 110 and a secure module 120. The non-secure module 110 may operate in various normal modes (or a normal environment). When the first area 410 operates in the secure mode, the non-secure module 110 of the AP 100 may not access data stored in the first area 410. In contrast, the secure module 120 may operate in a secure environment. Accordingly, the secure module 120 of the AP 100 may be used to define (or "set") the operating mode of the first area 410 of the volatile memory 400 to either a normal mode or a secure mode, thereby controlling access to the first area 410.

Therefore, after the first area 410 of the volatile memory 400 is switched to the secure mode, the operation of verifying the integrity of the first firmware image FI1 stored in the first area 410 of the volatile memory 400 may be performed by the secure module 120 included in the AP 100.

Figure 2:
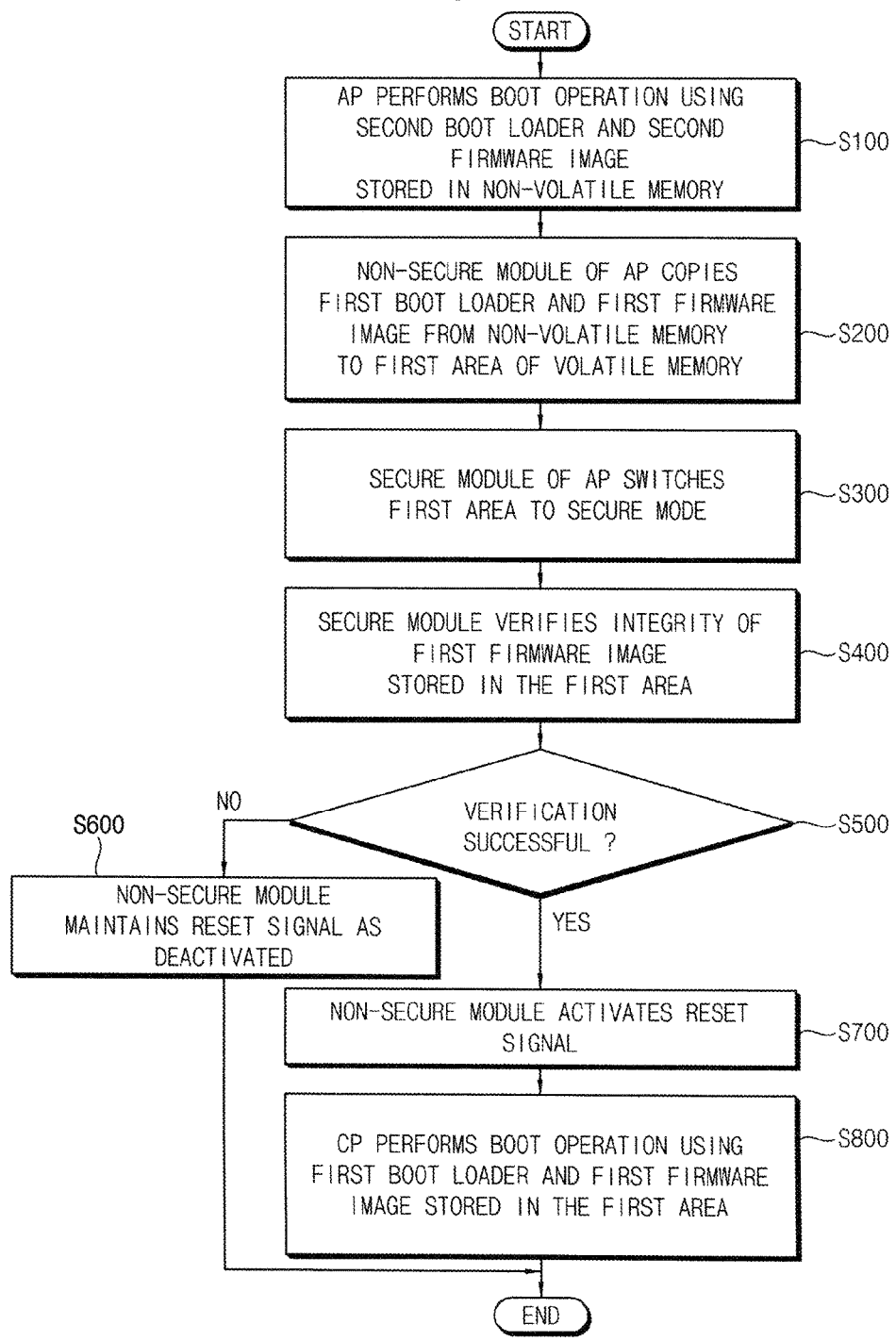
FIG. 2 is a flowchart summarizing in one example a method of operating a SoC according to certain embodiments of the inventive concept.

FIG. 2 is a flowchart summarizing in one example a method of operating the SoC 10 of FIG. 1. FIGS. 3 through 8 are respectively block diagrams further describing the SoC operating method of FIG. 2. Reference is hereafter collectively made to FIGS. 1 through 8.

During the initial stage(s) of a power-up operation for the SoC 10, it is assumed that the first area 410, second area 420, and third area 430 of the volatile memory 400 operate in a normal (non-secure) mode. Thus, upon power-up of the SoC 10, the AP 100 may perform a AP boot operation using the second boot loader BL2 and the second firmware image FI2 stored in the non-volatile memory 300 (S100).

Figure 3:
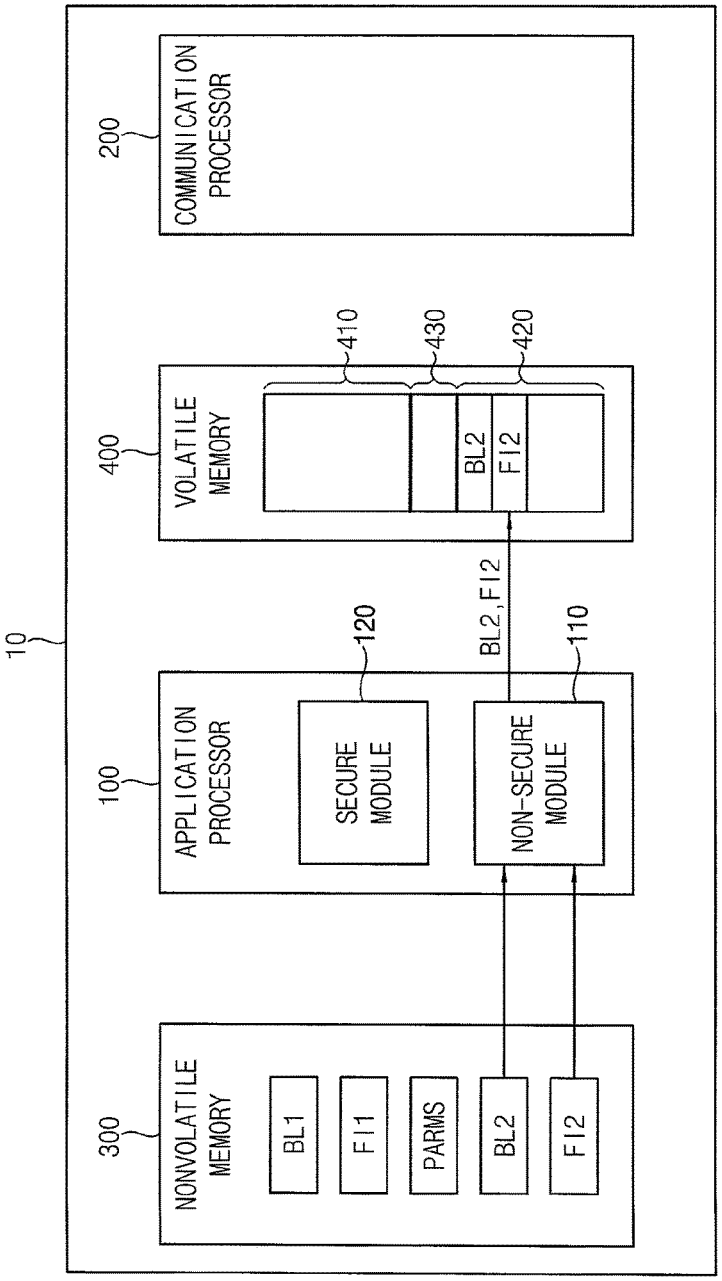
FIGS. 3, 4, 5, 6, 7 and 8 (inclusively, FIGS. 3 through 8) are respective block diagrams that further describe possible design, implementation and operating variations associated with the SoC of FIG. 1 and the SoC operating method of FIG. 2.

The block diagram of FIG. 3 describes the performing of the AP boot operation using the second boot loader BL2 and second firmware image FI2 stored in the non-volatile memory 300 (S100). Referring to FIG. 3, the non-secure module 110 of AP 100 copies the second boot loader BL2 and the second firmware image FI2 from the non-volatile memory 300 to the second area 420 of the volatile memory 400 during power-up. Thereafter, the non-secure module 110 may execute the AP boot operation by executing at least one of the second boot loader BL2 and second firmware image FI2 stored in the second area 420 of the volatile memory 400. For example, the non-secure module 110 may execute the second boot loader BL2 and then execute the second firmware image FI2 which includes operating system code for the AP 100 based on the second boot loader BL2.

Figure 4:
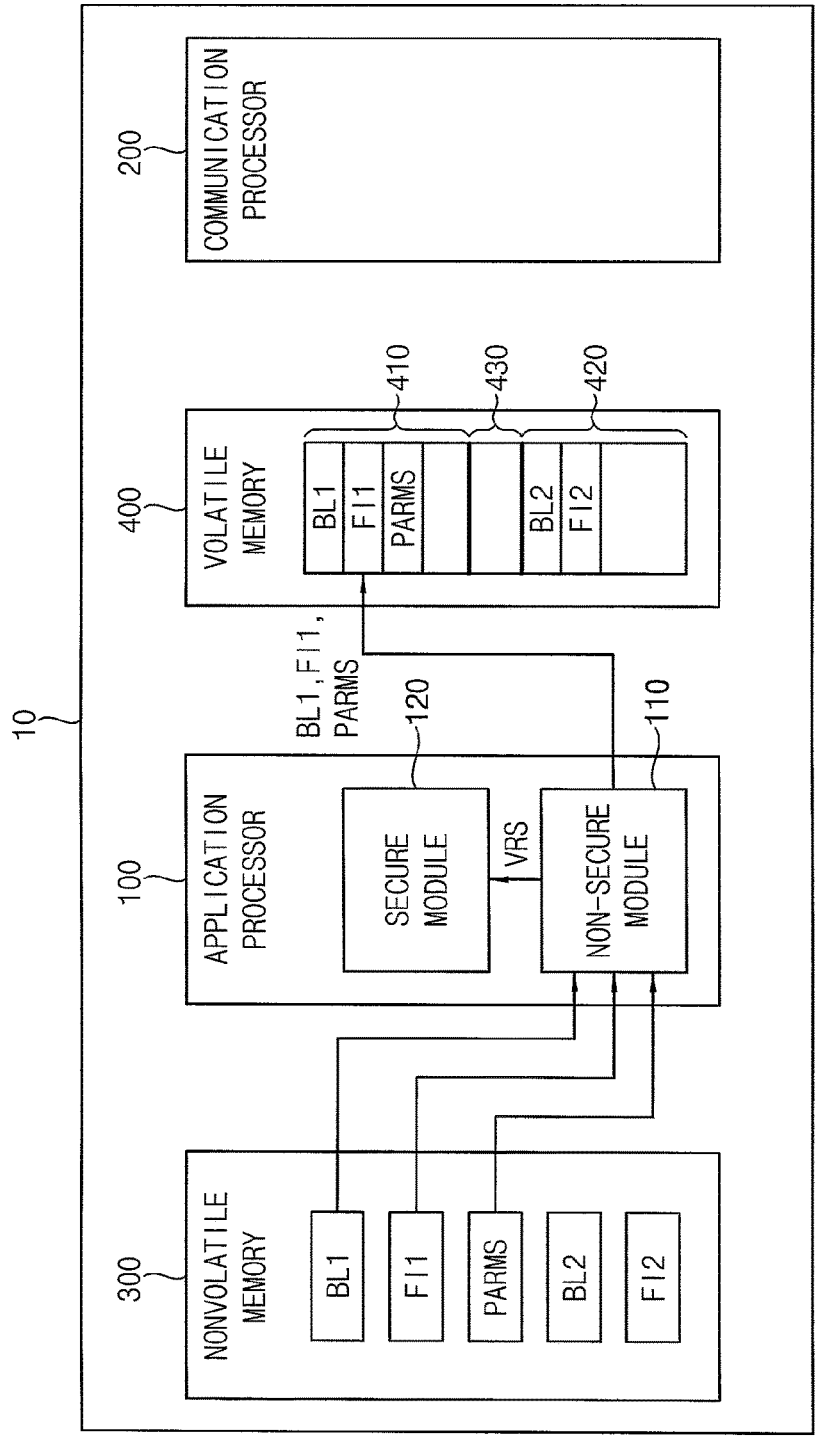

Referring now to FIGS. 2 and 4, once the AP 100 has successfully booted, the non-secure module 110 of the AP 100 may copy the first boot loader BL1, first firmware image FI1, and operating parameters PARMS stored in the non-volatile memory 300 to the first area 410 of the volatile memory 400 (S200). Since the first area 410, second area 420, and third area 430 of the volatile memory 400 operate in the normal mode during at least the initial stage(s) of the power-up operation for the SoC 10, the non-secure module 110 operating in the normal (non-secure) mode is able to copy the first boot loader BL1, first firmware image FI1, and operating parameters PARMS from the non-volatile memory 300 to the first area 410 of the volatile memory 400.

Figure 5:
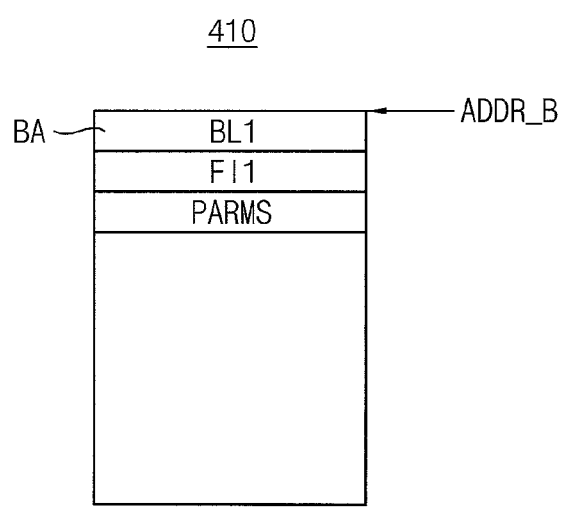

FIG. 5 is a block diagram illustrating in one example the first area 410 of the volatile memory 400 in a state after the non-secure module 110 has successfully copied the first boot loader BL1, first firmware image FI1, and operating parameters PARMS from the non-volatile memory 300 to the first area 410 of the volatile memory 400. Here, it is assumed that the non-secure module 110 begins storing the first boot loader BL1 at a designated boot area BA beginning at a predetermined boot address ADDR_B in the first area 410 of the volatile memory 400.

The predetermined boot address ADDR_B may be pre-stored in the CP 200. Therefore, as will be described later with reference to FIG. 8, the CP 200 may read the first boot loader BL1 from the boot area BA, which corresponds to the predetermined boot address ADDR_B, among the first area 410 of the volatile memory 400 in response to the activated reset signal RST, and perform the CP boot operation by executing the first boot loader BL1 and then executing the first firmware image FI1, which includes the operating system code of the CP 200, based on the first boot loader BL1.

Referring again to FIGS. 2 and 4, after the non-secure module 110 copies the first boot loader BL1, first firmware image FI1, and operating parameters PARMS stored in the non-volatile memory 300 to the first area 410 of the volatile memory 400, the non-secure module 110 may then provide a verification request signal VRS to the secure module 120.

Figure 6:
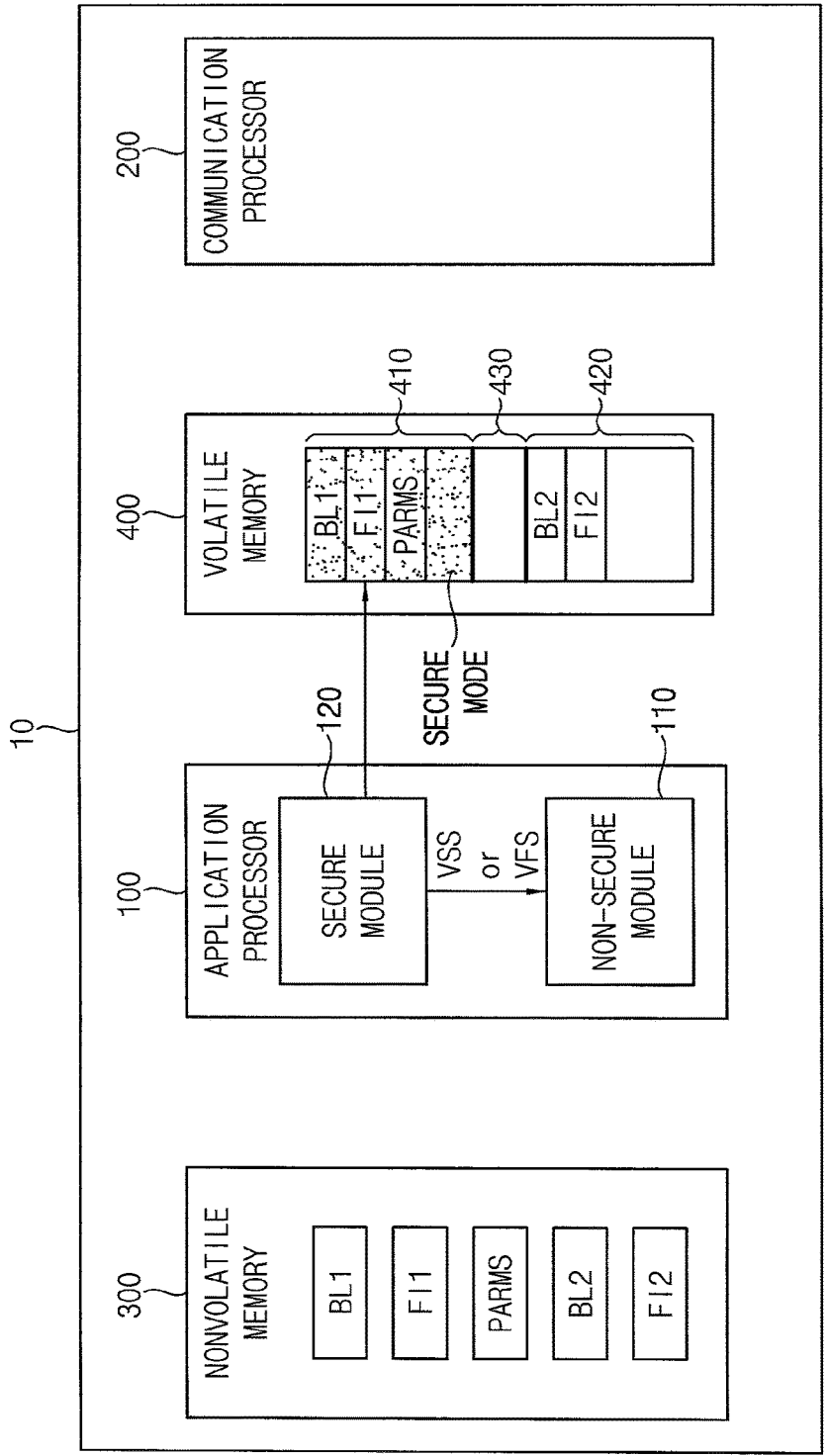

Referring to FIGS. 2 and 6, the secure module 120 may switch the first area 410 of the volatile memory 400 from the normal (non-secure) mode to the secure mode in response to the verification request signal VRS (S300). When the first area 410 is switched to the secure mode, only the CP 200 and secure module 120 of the AP 100 may be allowed to access the first area 410. Therefore, once the first area 410 has been switched from the normal (non-secure) mode to the secure mode, data stored in the first area 410 is decidedly more difficult to access in an unauthorized manner.

Figure 7:
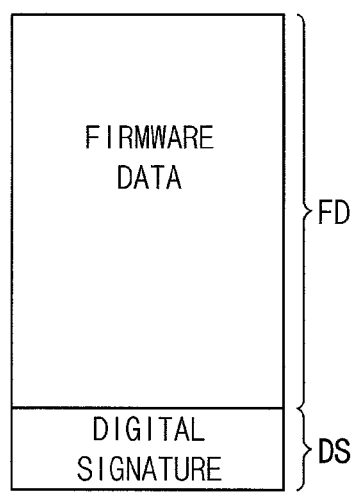
Figure 8:
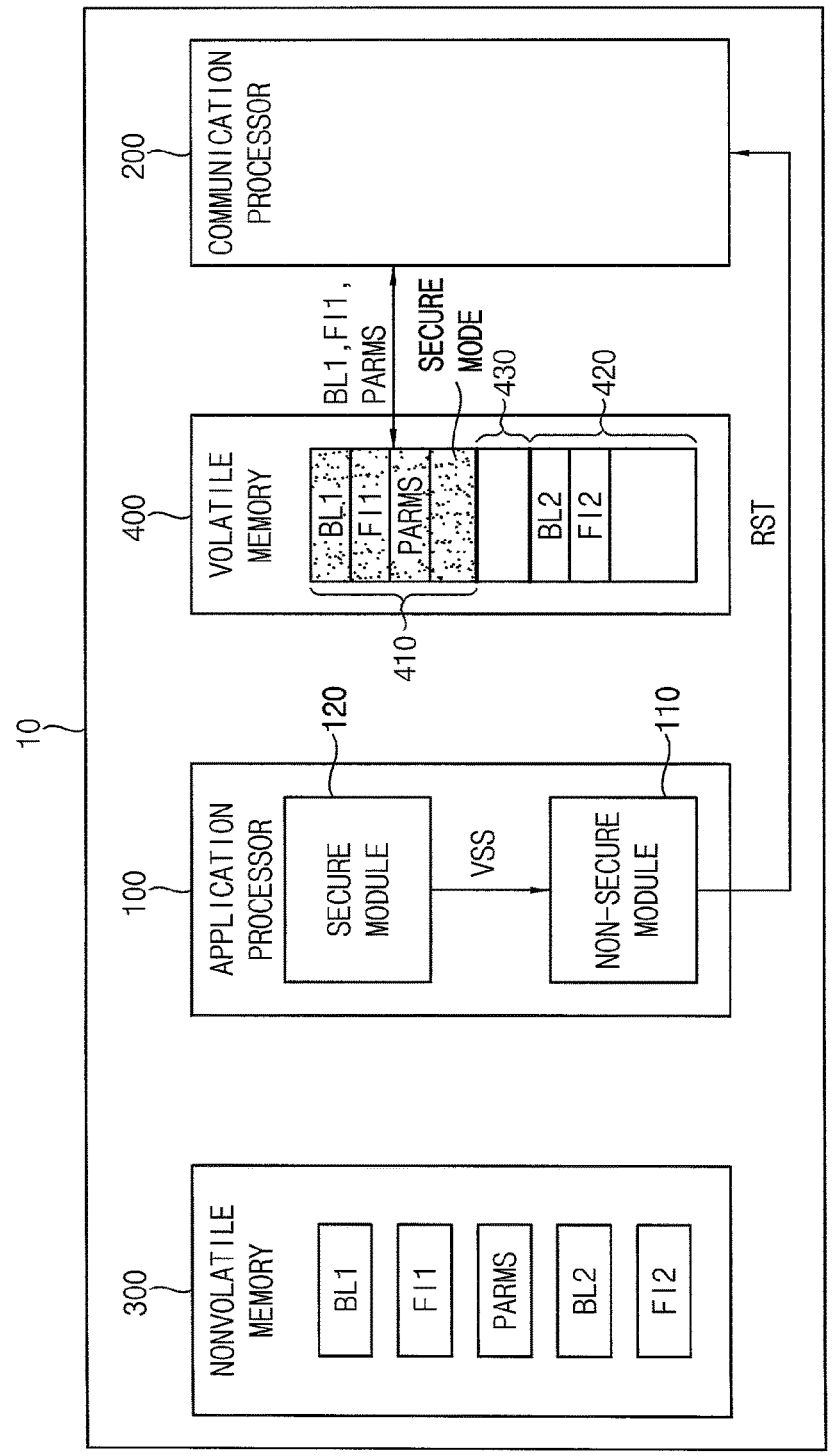

Following the switch from normal mode to secure mode, the secure module 120 may verify the integrity of the first firmware image FI1 stored in the first area 410 of the volatile memory 400 (S400). The block diagram of FIG. 7 shows one example of the first firmware image FI1 including first firmware data FD corresponding to the operating system code of the CP 200, and a digital signature DS derived from (or computationally related to) the first firmware data FD.

The digital signature DS may be derived (or generated) by applying one or more conventionally understood encryption algorithms or data security approaches to the first firmware data FD. For example, a public key capable of decrypting the digital signature DS may be stored in the AP 100, where in certain embodiments of the inventive concept, the public key is stored in the AP 100 during the manufacturing of the SoC 10. In other embodiments of the inventive concept, a public key is downloaded from an external source to the AP 100. However, specifically provided, the secure module 120 may verify the integrity of the first firmware image FI1 stored in the first area 410 of the volatile memory 400 using the digital signature DS.

In some embodiments, the secure module 120 may determine whether the first firmware data FD included in the first firmware image FI1 has been changed after the digital signature DS included in the first firmware image FI1 was generated using (e.g.,) the digital signature DS and the public key. In this regard, the secure module 120 may decrypt the digital signature DS using the public key to generate decryption data, and compare the decryption data with the first firmware data FD to determine whether the first firmware data FD has been changed after the digital signature DS was generated. When it is determined that the first firmware data FD has been changed after the digital signature DS was generated, the secure module 120 may determine that the first firmware image FI1 stored in the first area 410 of the volatile memory 400 is unreliable and the verification is deemed to be unsuccessful (S500=NO). Accordingly, a verification fail signal VFS may be communicated from the secure module 120 to the non-secure module 110. When the non-secure module 110 receives the verification fail signal VFS, it will maintain the reset signal RST in a deactivated state (S600). And when the reset signal RST is maintained as deactivated, the CP 200 is maintained in an OFF state and does not perform a boot operation.

In contrast, when it is determined that the first firmware data FD is unchanged since the digital signature DS was generated, the secure module 120 may determine that the first firmware image FI1 stored in the first area 410 of the volatile memory 400 is reliable and the verification is deemed successful (S500=YES). Accordingly, a verification success signal VSS may be communicated from the secure module 120 to the non-secure module 110. And when the non-secure module 110 receives the verification success signal VSS, the non-secure module 110 may activate the reset signal RST (S700). When the reset signal RST is activated, the CP 200 may perform its own boot operation using the first boot loader BL1 and first firmware image FI1 stored in the first area 410 of the volatile memory 400 (S800).

For example, when the reset signal RST is activated, the CP 200 may read the first boot loader BL1 from the boot area BA at the boot address ADDR_B of the first area 410 of the volatile memory 400, and perform the CP boot operation by executing the first boot loader BL1 and then executing the first firmware data FD, which includes the operating system code of the CP 200, based on the first boot loader BL1.

As described above, since the CP 200 operates in the secure environment, the CP 200 may read the first boot loader BL1 and first firmware image FI1 from the first area 410 of the volatile memory 400, even when the first area 410 of the volatile memory 400 operates in the secure mode (or has been designated as a secure data area).

Once the CP 200 has successfully booted, the CP 200 may perform the normal operation using the operating parameters PARMS stored in the first area 410 of the volatile memory 400. While the CP 200 performs a variety of normal operations, the CP 200 may access the entire first area 410 of the volatile memory 400 as a working memory, except for those areas of the first area 410 storing the first boot loader BL1, first firmware image FI1, and operating parameters PARMS. In some embodiments, since the first boot loader BL1 is not used after the CP 200 is booted up, the CP 200 may use the boot area BA storing the first boot loader BL1 as a working memory to increase the effective size of the working memory while the CP 200 performs the normal operation.

In contrast to SoCs including multiple processors, each including a non-volatile memory storing a boot loader and firmware data as well as a volatile memory to which the boot loader and firmware data are copied from the non-volatile memory prior to powered up, certain embodiments of the inventive concept, like those described above with reference to FIGS. 1 through 8, include an AP, a CP, a non-volatile memory accessed by the AP 100 and a volatile memory 400 shared by the AP 100 and CP 200. Since these embodiments of the inventive concept do not require separate non-volatile memories (e.g., a non-volatile memory directly accessed by the CP 200), a single non-volatile memory may be used to store a boot loader and a firmware image for the CP as well as a boot loader and a firmware image for the AP. As a result, SoC provided by embodiments of the inventive concept may be relatively small in physical size.

In addition, when SoC consistent with embodiments of the inventive concept are powered up, the constituent AP may copy a first boot loader and first firmware image stored in the non-volatile memory accessible by the AP but not the CP to a first area of the shared volatile memory. The CP may then perform a boot operation using the first boot loader and the first firmware image stored in the first area of the volatile memory. In this manner, since the boot operation of the CP is performed based upon a memory copy operation, the overall speed of the boot operation for the CP may be increased.

In addition, since the first area of the volatile memory may be switched from a normal mode to a secure mode after the first boot loader and the first firmware image have been copied to the first area of the volatile memory, the integrity of the first firmware image stored in the first area of the volatile memory may be effectively verified. Therefore, the CP may be booted only after verification of the first firmware image has been deemed successful. As a result, many forms of external threat to the boot operation may be effectively blocked, and the overall data and operational security of the SoC 10 may be improved.

Figure 9:
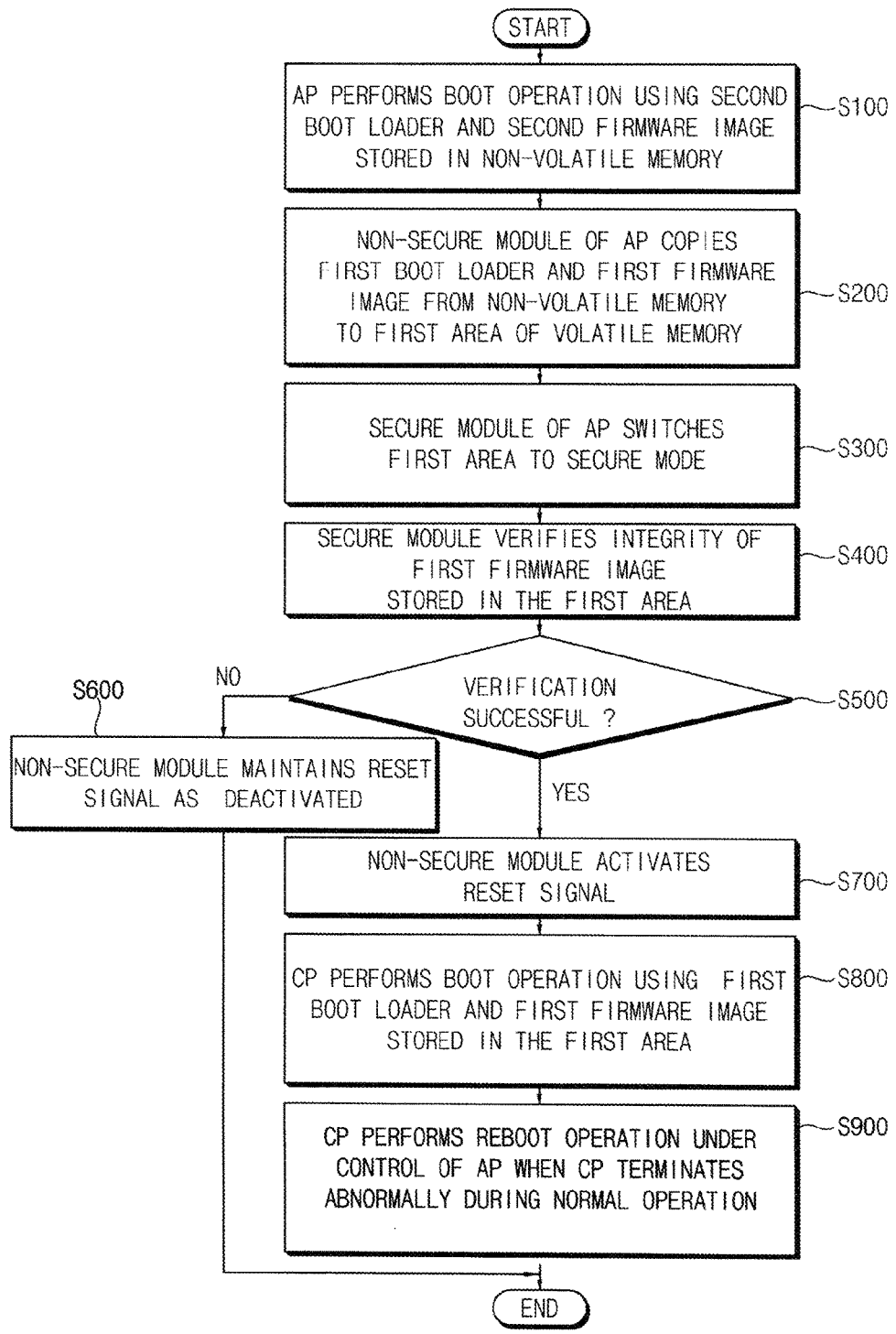
FIG. 9 is a flowchart summarizing in another example a method of operating a SoC according to certain embodiments of the inventive concept.

FIG. 9 is a flowchart illustrating in another example a method of operating the SoC of FIG. 1. The method of FIG. 9 is largely the same as the method of FIG. 2, except that the method of FIG. 9 further includes a reboot process (S900). Referring to FIGS. 1 through 9, the CP 200 may perform a reboot operation under the control of the AP 100 when the CP 200 terminates abnormally during a normal operation following completion of the initial boot operation (step S900).

Figure 10:
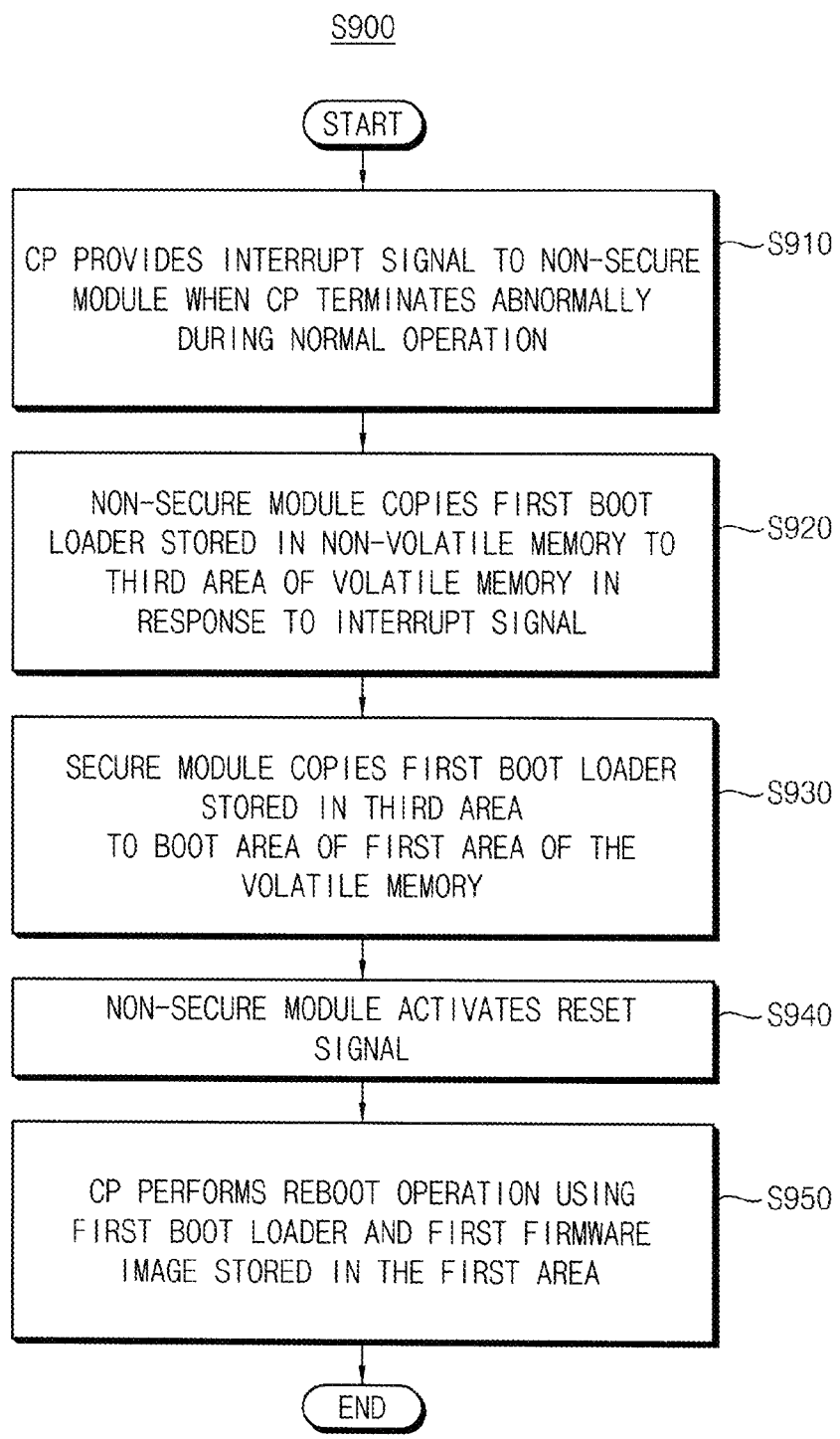
FIG. 10 is a flowchart further describing the step of reboot of the communication processor (S900) in the method of FIG. 9.
Figure 11:
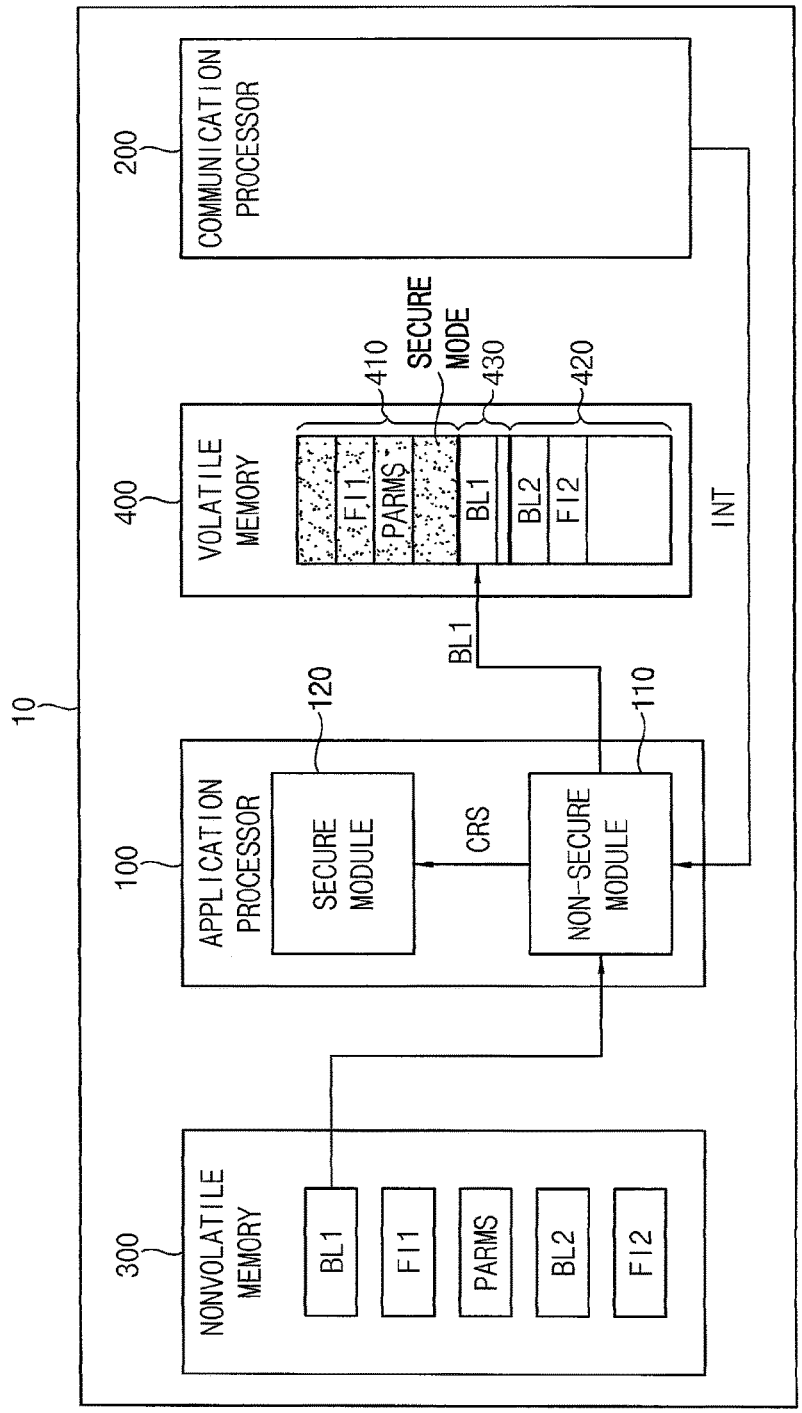
FIGS. 11 and 12 are respective block diagrams further describing the step of reboot of the communication processor (S900) in the method of FIGS. 9 and 10.
Figure 12:
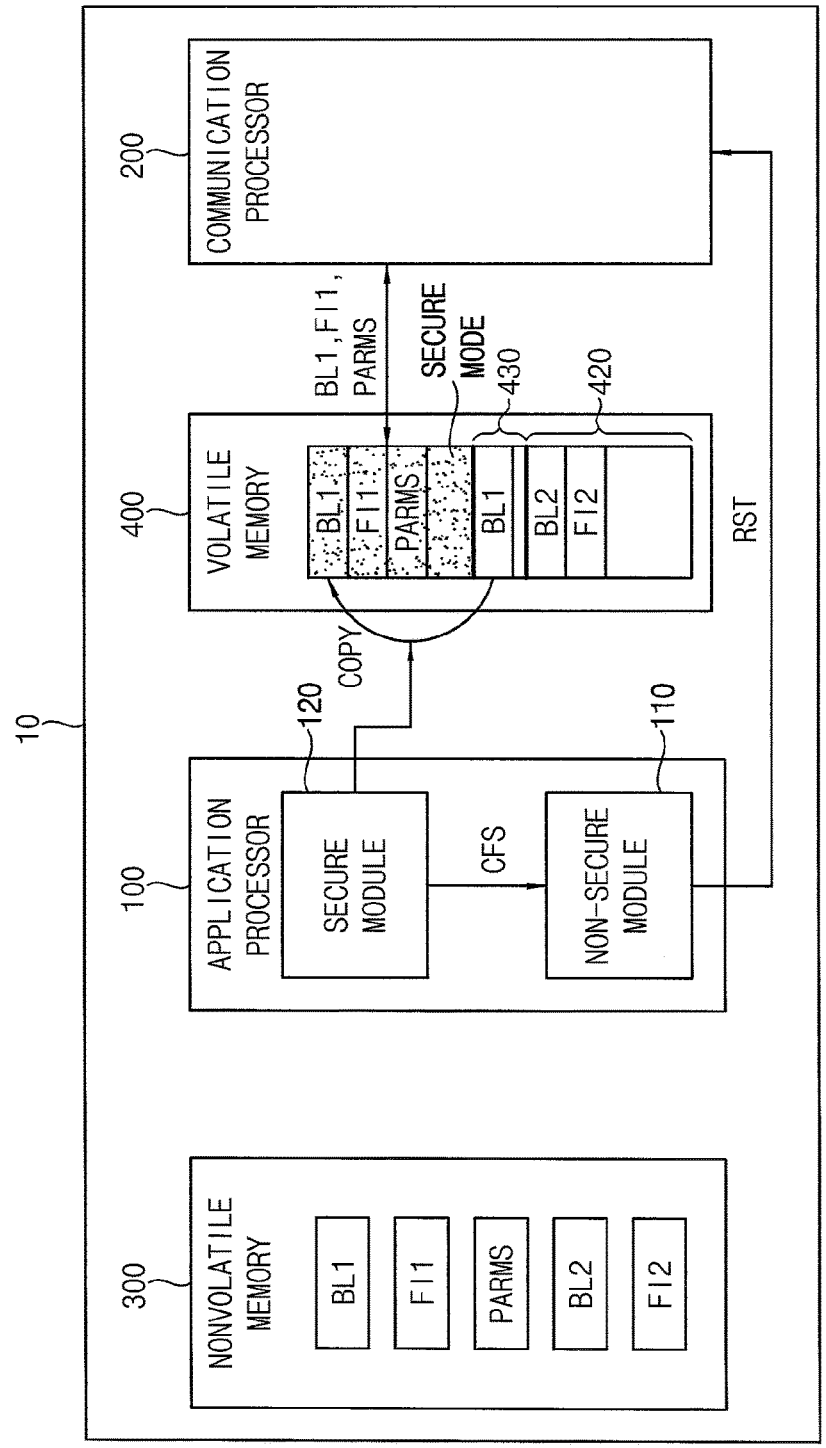

FIG. 10 is a flowchart further illustrating in one example the reboot operation of FIG. 9, and FIGS. 11 and 12 are respective block diagrams further describing the reboot operation of FIGS. 9 and 10.

Referring to FIGS. 1 through 12, when the CP 200 terminates abnormally during execution of a normal access operation (e.g., a read, a write or an erase operation), the CP 200 may correspondingly provide an interrupt signal INT to the AP 100 (S910). In some embodiments, the interrupt signal INT may be provided to the non-secure module 110 of the AP 100. Since in certain embodiments, the CP 200 may use the boot area BA initially designated to store first boot loader BL1 as a working memory during normal operations, the data version of the first boot loader BL1 stored in the boot area BA of the first area 410 when the interrupt signal INT is generated may no longer be valid. Accordingly, in order to properly reboot the CP 200, the known-valid first boot loader BL1 stored in the non-volatile memory 300 may be re-copied to the first area 410 of the volatile memory 400.

However, since the first area 410 of the volatile memory 400 may be in the secure mode even after the CP 200 terminates abnormally, the non-secure module 110 may not be able to copy the first boot loader BL1 stored in the non-volatile memory 300 to the first area 410 of the volatile memory 400. However, the secure module 120 may be able to access the first area 410 of the volatile memory 400 although the first area 410 of the volatile memory 400 operates in the secure mode.

Therefore, as illustrated in FIG. 11, the non-secure module 110 may copy the first boot loader BL1 stored in the non-volatile memory 300 to the third area 430 of the volatile memory 400 in response to the interrupt signal INT, and provide a copy request signal CRS to the secure module 120 (S920).

Referring to FIG. 12, the secure module 120 may copy the first boot loader BL1 stored in the third area 430 of the volatile memory 400 to the boot area BA among the first area 410 of the volatile memory 400 in response to the copy request signal CRS, and provide a copy finish signal CFS to the non-secure module 110 (S930).

The non-secure module 110 may activate the reset signal RST in response to the copy finish signal CFS (S940).

After the reset signal RST is activated, the CP 200 may perform the boot operation using the first boot loader BL1 and the first firmware image FI1 stored in the first area 410 of the volatile memory 400 (S950).

For example, when the reset signal RST is activated, the CP 200 may read the first boot loader BL1 from the boot area BA beginning at the predetermined boot address ADDR_B, and perform the reboot operation by executing the first boot loader BL1 and then executing the first firmware data FD which includes the operating system code of the CP 200 based on the first boot loader BL1.

As described above with reference to FIGS. 9 through 12, since the CP 200 uses the boot area BA storing the first boot loader BL1 as a working memory during the normal operation, a size of the working memory may be effectively increased. However, even when the CP 200 terminates abnormally under these operating assumptions, the AP 100 may nonetheless copy the first boot loader BL1 stored in the non-volatile memory 300 to the first area 410 of the volatile memory 400 while the first area 410 of the volatile memory 400 operates in the secure mode, and the CP 200 may perform the boot operation using the first boot loader BL1 and the first firmware image FI1 stored in the first area 410 of the volatile memory 400. Therefore, the CP 200 may be rebooted quickly and safely.

Figure 13:
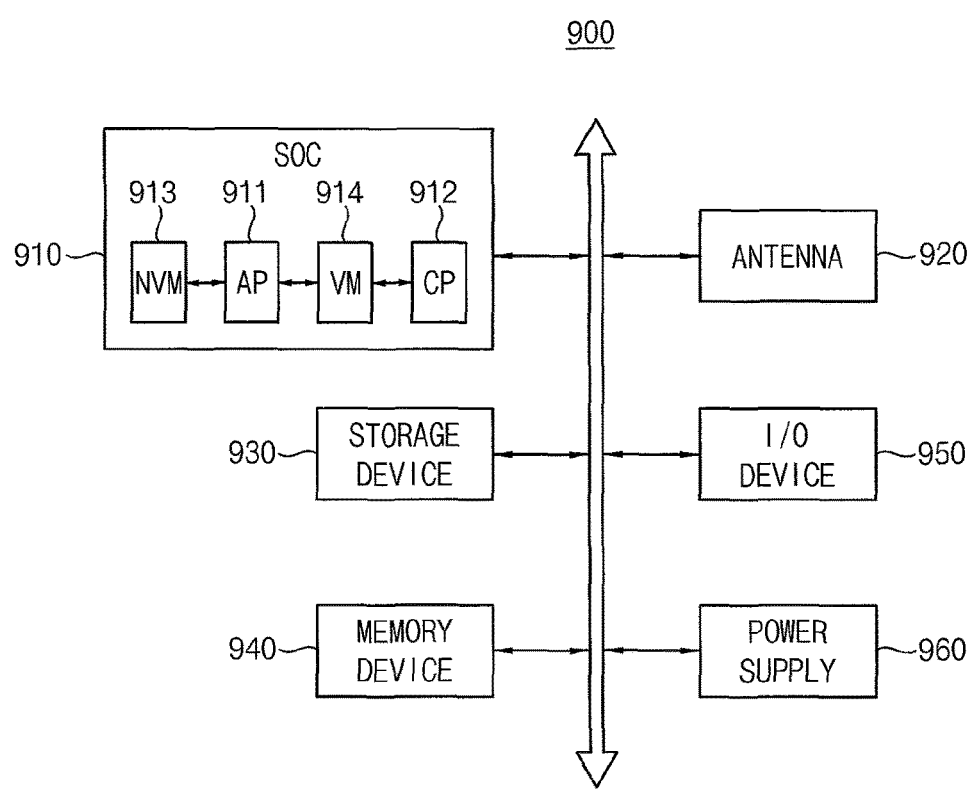
FIG. 13 is a block diagram illustrating an electronic device incorporating a SoC according to an embodiments of the inventive concept.

FIG. 13 is a block diagram illustrating an electronic device incorporating a SoC according to an embodiment of the inventive concept.

Referring to FIG. 13, an electronic device 900 includes a SoC 910, an antenna 920, a storage device 930, a memory device 940, an input/output device 950, and a power supply 960.

The SoC 910 may include an AP 911, a CP 912, a non-volatile memory NVM 913, and a volatile memory VM 914. The CP 912 included in the SoC 910 may communicate with an external device using the antenna 920. Here, the SoC 910 may be implemented with the SoC 10 of FIG. 1.

The storage device 930 may store data received from the external device through the CP 912 and data to be transferred to the external device through the CP 912.

The memory device 940 may store data required for an operation of the electronic device 900.

The input/output device 950 may include a touch screen, a keypad, a keyboard, a mouse, a printer, etc. The power supply 960 may supply an operational power.

The foregoing embodiments are merely illustrative of the inventive concept. Those skilled in the art will readily appreciate that many modifications are possible to the illustrated embodiments without materially departing from the scope of the inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A system-on-chip (SoC), comprising:
a non-volatile memory that stores a first boot loader and a first firmware image;
a volatile memory including a first area, a second area, and a third area;
an application processor (AP) comprising a secure module and a non-secure module and configured upon powered-up to copy the first boot loader and first firmware image from the non-volatile memory to the first area, switch the first area from a normal mode to a secure mode, verify integrity of the first firmware image stored in the first area, and activate a reset signal upon successfully verifying the integrity of the first firmware image, wherein the secure module among the secure module and the non-secure module is allowed access to the first area after the first area has been switched to the secure mode; and
a communication processor (CP) configured to perform a CP boot operation using at least one of the first boot loader and first firmware image stored in the first area in response to the activated reset signal.

2. The SoC of claim 1, wherein the first firmware image includes a first firmware data corresponding to an operating system code for the CP, and a digital signature derived from the first firmware data.

3. The SoC of claim 2, wherein the AP verifies the integrity of the first firmware image by determining whether the first firmware data has been changed after the digital signature was derived using the digital signature and a public key.

4. The SoC of claim 1, wherein the CP and the secure module of the AP are allowed access the first area after the first area has been switched to the secure more.

5. The SoC of claim 1, wherein the non-volatile memory stores operating parameters, and upon power-up, the AP is further configured to copy the operating parameters to the first area.

6. The SoC of claim 1, wherein the non-volatile memory stores a second boot loader and a second firmware image, and upon power-up, the AP is further configured to copy the second boot loader and second firmware image from the non-volatile memory to the second area, and thereafter, perform an AP boot operation using at least one of the second boot loader and second firmware image stored in the second area.

7. The SoC of claim 1, wherein the AP is further configured to copy the first boot loader from the non-volatile memory to a boot area of the first area beginning at a predetermined boot address.

8. The SoC of claim 7, wherein the CP stores the predetermined boot address before power-up and is further configured to read the first boot loader from the boot area beginning at the predetermined boot address in response to the activated reset signal, and perform the CP boot operation by executing the first boot loader.

9. The SoC of claim 8, wherein after performing of the CP boot operation, the CP is further configured to perform a normal operation using the boot area as a working memory.

10. The SoC of claim 1, wherein the
non-secure module is allowed to access the first area only when the first area is in the normal mode.

11. The SoC of claim 10, wherein the AP is further configured to:
copy the first boot loader and first firmware image from the non-volatile memory to the first area upon power-up using the non-secure module, and thereafter, to provide a verification request signal from the non-secure module to the secure module,
switch the first area from the normal mode to the secure mode using the secure module in response to the verification request signal,
verify the integrity of the first firmware image stored in the first area using the secure module,
provide upon successfully verifying the integrity of the first firmware image a verification success signal from the secure module to the non-secure module or provide upon not successfully verifying the integrity of the first firmware image a verification fail signal from the secure module to the non-secure module, and activate the reset signal upon receiving the verification success signal using the non-secure module, or maintain the reset signal as deactivated upon receiving the verification fail signal using the non-secure module.

12. The SoC of claim 10, wherein the second area is accessed by only the AP, and the third area is accessed by both of the AP and CP.

13. The SoC of claim 12, wherein the CP is further configured to:

provide an interrupt signal to the non-secure module when the CP terminates abnormally during the normal operation after performing the CP boot operation, and perform a reboot operation using the first boot loader and first firmware image stored in the first area in response to the activated reset signal; and the AP is further configured to:

copy the first boot loader stored in the non-volatile memory to the third area using the non-secure module in response to the interrupt signal and provide a copy request signal to the secure module, copy the first boot loader from the third area to a boot area of the first area in response to the copy request signal using the secure module and provide a copy finish signal to the non-secure module, activate the reset signal using the secure module in response to the copy finish signal.

14. The SoC of claim 13, wherein while the CP performs the reboot operation, the first area is maintained in the secure mode.

15. An electronic device, comprising:

an antenna;

a storage device that stores data; and a System-on-Chip (SoC) configured to communicate the data with an external device using the antenna; the SoC including:

a non-volatile memory that stores a first boot loader and a first firmware image;

a volatile memory including a first area, a second area, and a third area;

an application processor (AP) comprising a secure module and a non-secure module and configured upon power-up to copy the first boot loader and first firmware image from the non-volatile memory to the first area, switch the first area from a normal mode to a secure mode, verify integrity of the first firmware image stored in the first area, and to activate a reset signal when the verification succeeds, wherein the secure module among the secure module and the non-secure module is allowed access to the first area after the first area has been switched to the secure mode; and a communication processor (CP) configured to perform a CP boot operation using the first boot loader and first firmware image stored in the first area in response to the activated reset signal.

16. A system-on-chip (SoC), comprising:

an application processor (AP) including a secure module and a non-secure module;

a communication processor (CP);

a volatile memory having a first area accessible by the CP, a second area accessible by only the AP, and a third area accessible by the CP and the AP; and a non-volatile memory storing a first boot loader, a first firmware image, a second boot loader, a second firmware image and operating parameters;

upon power-up of the SoC, the AP is configured to:

(1) copy the second boot loader and second firmware image from the non-volatile memory to the second area, and perform an AP boot operation using the second boot loader and second firmware image;

(2) copy the first boot loader, first firmware image and the operating parameters from the non-volatile memory to the first area using the non-secure module;

(3) switch the first area from a normal mode to a secure mode using the secure module;

(4) verify integrity of the first firmware image stored in the first area, and upon successfully verifying the integrity of the first firmware activate a reset signal provided to the CP; and the CP is configured to perform a CP boot operation using the first boot loader, first firmware image and operating parameters stored in the first area in response to the activated reset signal.

17. The SoC of claim 16, wherein after the performing of the CP boot operation, the CP is further configured to perform a normal operation, and upon abnormally terminating the normal operation, the CP is further configured to perform a reboot operation.

18. The SoC of claim 17, wherein upon performing of the reboot operation, the CP is further configured to provide an interrupt signal to the non-secure module, the non-secure module is configured in response to the interrupt signal to re-copy the first boot loader from the non-volatile memory to the third area;

the secure module is configured in response to the interrupt signal to copy the first boot loader from the third area to the first area, and thereafter activate a reset signal, such that the CP performs the reboot operation using the first boot loader copied by the secure module from the third area to the first area.

19. The SoC of claim 16, wherein the first area may be set to operate in a normal mode or a secure mode by the secure module, the CP never has access to the non-volatile memory and the second area, and the non-secure module only has access to the first area when the first area is set to operate in the normal mode.

20. The SoC of claim 16, wherein the CP remains powered off and will not perform the CP boot operation until the reset signal is activated.

* * * * *